(12) United States Patent
Tachihara et al.

(10) Patent No.: US 6,536,748 B1
(45) Date of Patent: Mar. 25, 2003

(54) EVAPORATOR RAW FUEL INJECTION APPARATUS

(75) Inventors: Takahiro Tachihara, Saitama (JP); Naoyuki Abe, Saitama (JP); Yuuji Asano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/704,706

(22) Filed: Nov. 3, 2000

(30) Foreign Application Priority Data

Nov. 5, 1999 (JP) .......................................... 11-316001

(51) Int. Cl.⁷ ................................................. B01F 3/04
(52) U.S. Cl. ..................... 261/79.2; 261/79.1; 261/155; 261/DIG. 83
(58) Field of Search ........................ 261/21, 79.1, 79.2, 261/152, 155, DIG. 55, DIG. 83

(56) References Cited

U.S. PATENT DOCUMENTS

| | | | | |
|---|---|---|---|---|
| 1,233,557 A | * | 7/1917 | Curtis .................... | 261/79.1 X |
| 3,336,017 A | * | 8/1967 | Kopa .................... | 261/79.1 X |
| 3,395,899 A | * | 8/1968 | Kopa .................... | 261/79.1 X |
| 3,512,359 A | * | 5/1970 | Pierce .................... | 261/79.1 X |
| 3,530,844 A | * | 9/1970 | Kawai .................... | 261/79.1 X |
| 3,720,058 A | * | 3/1973 | Collinson et al. ....... | 261/79.1 X |
| 3,743,258 A | * | 7/1973 | Florentine .............. | 261/79.1 X |
| 3,872,191 A | * | 3/1975 | Walcker ................. | 261/79.1 X |
| 3,944,634 A | * | 3/1976 | Gerlach .................. | 261/79.1 X |
| 5,472,645 A | * | 12/1995 | Rock et al. .......... | 261/DIG. 55 |
| 5,672,187 A | * | 9/1997 | Rock et al. ............. | 261/79.1 X |
| 6,113,078 A | * | 9/2000 | Rock ........................... | 261/21 |

FOREIGN PATENT DOCUMENTS

JP         A-2000-319002        11/2000

* cited by examiner

Primary Examiner—Richard L. Chiesa
(74) Attorney, Agent, or Firm—Arent Fox Kintner Plotkin & Kahn

(57) ABSTRACT

A fuel evaporator raw fuel injection apparatus 40A includes an evaporator having an evaporating chamber 11 in which raw fuel liquid FL is evaporated by a high temperature heating chamber (heating gas) into raw fuel gas, and which is provided with a first injection portion (fuel injection portion 41A) that injects the raw fuel liquid FL into the evaporating chamber 11, and a second injection portion (air injection portion 42A) that injects gas or liquid (air A) with a prescribed directional property into the raw fuel liquid FL injected from the fist injection portion (fuel injection portion 41A), adequately atomizes and disperses raw fuel liquid and achieves highly efficient evaporation of raw fuel liquid.

3 Claims, 8 Drawing Sheets

6,536,748 B1

EVAPORATOR RAW FUEL INJECTION APPARATUS

BACKGROUND OF THE INVENTION

1. Field of the Invention

The present invention relates to an evaporator that is provided in a fuel cell system and that evaporates raw fuel liquids, and particularly to an evaporator raw fuel injection apparatus that offers improved evaporating efficiency for raw fuel liquids.

2. Description of the Related Arts

Recent years have seen accelerated development of fuel cells for fuel cell-equipped automobiles provided with fuel cell systems, because of their environmental friendliness in generating electrical energy. One such fuel cell system is the so-called methanol-reformed fuel cell system. This fuel cell system employs, for example, a mixture of water and methanol as the raw fuel liquid, and is equipped with a fuel evaporator that evaporates the raw fuel liquid and supplies raw fuel gas to a reformer. For autothermal reformers, reforming air including oxygen-containing gas such as air is mixed with the raw fuel gas evaporated by the fuel evaporator, and supplied to the reformer.

As an example of a fuel evaporator provided in a conventional fuel cell system, the fuel evaporator described in Japanese Patent Application No. Hei 11-125366 by the present applicant will be explained with reference to FIG. 8. As shown in FIG. 8, the fuel evaporator 100 evaporates raw fuel liquid FL in an evaporating chamber 110 with high temperature heating gas HG generated in a combustor (not shown), producing evaporated raw fuel liquid FL (hereunder referred to as "raw fuel gas FG"). In addition, the fuel evaporator 100 supplies the raw fuel gas FG produced by the evaporating chamber 110 to a superheating chamber 120 where it is superheated by the heating gas HG exiting from the evaporating chamber 110. The evaporating chamber 110 and superheating chamber 120 are connected by a guide conduit 130 formed along the floor 110A of the evaporating chamber 110. The evaporating chamber 110 houses a plurality of U-shaped heat medium tubes 111, 111 . . . that conduct the heating gas HG to the inside, and the heating gas HG is conveyed from the heat medium tubes 111, 111 . . . through the guide conduit 130. The fuel evaporator 100 injects the raw fuel liquid FL from the raw fuel injection apparatus 140 toward the heat medium tubes 111, 111 . . . . The raw fuel liquid FL injected from the raw fuel injection apparatus 140 contacts with the heat medium tubes 111, 111 . . . so that it undergoes exchange with the heat received from the heating gas HG and is evaporated. The fuel evaporator 100 supplies the raw fuel gas FG produced by evaporation of the raw fuel liquid FL into vapor tubes 121, 121 . . . situated in the superheating chamber 120. The fuel evaporator 100 also supplies the heating gas HG discharged from the heat medium tubes 111, 111 . . . into the superheating chamber 120 through the guide conduit 130. Thus, the raw fuel gas FG flowing through the vapor tubes 121, 121 . . . is superheated by the heating gas HG fed into the superheating chamber 120. Also, the fuel evaporator 100 then discharges the superheated raw fuel gas FG from the vapor tubes 121, 121 . . . and feeds it to a reformer (not shown). In an autothermal system, air is usually fed in between the fuel evaporator 100 and the reformer as reforming air by air compressor (not shown). This air and the raw fuel gas FG produced in the fuel evaporator 100 are mixed and supplied to the reformer.

However, if the raw fuel liquid is not adequately atomized, dispersed and contacted with the heat medium tubes 111, 111 . . . the exchange efficiency for exchange with the heat received from the heating gas HG will be lower, thus reducing the evaporation efficiency. This will cause the unevaporated raw fuel liquid FL to accumulate in the evaporating chamber 110, creating liquid pools. The evaporation efficiency is particularly reduced in cases of contact with low temperature areas of the heat medium tubes 111, 111 . . . or adhesion of liquid droplets of the flying raw fuel liquid FL onto the inner wall 110B and elsewhere in the evaporating chamber 110. Yet, since the raw fuel injection apparatus 140 injects the raw fuel liquid FL from the fuel injection nozzle (not shown) in only one fixed direction at a prescribed injection pressure, it is not possible to achieve adequate atomization or dispersion of the raw fuel liquid FL, while the injecting direction of the raw fuel liquid FL cannot be adjusted.

SUMMARY OF THE INVENTION

It is therefore an object of the present invention to provide an evaporator raw fuel injection apparatus which accomplishes adequate atomization and dispersion of the raw fuel liquid and evaporates the raw fuel liquid with high efficiency.

The evaporator raw fuel injection apparatus according to the invention which solves the aforementioned problems is characterized in that, in an evaporator having an evaporating chamber in which raw fuel liquid is evaporated by a high temperature heating medium, there are provided a first injection portion that injects the raw fuel liquid into the evaporating chamber, and a second injection portion that injects gas or liquid with a prescribed directional property into the raw fuel liquid injected from the first injection portion.

According to this evaporator raw fuel injection apparatus, a air stream is created by the gas or liquid injected from the second injection portion, and this stream atomizes and disperses the raw fuel liquid injected from the first injection portion into the evaporating chamber. Thus, evaporation of the raw fuel liquid is promoted by the heat received from the high temperature heating medium, for improved evaporation efficiency.

This evaporator raw fuel injection apparatus is characterized in that the second injection portion injects the injected gas or liquid in a swirling current.

According to this evaporator raw fuel injection apparatus, generation of a swirling current by the gas or liquid injected from the second injection portion can achieve greater atomization and dispersion of the raw fuel liquid injected from the first injection portion, thus providing even better evaporation efficiency.

The evaporator raw fuel injection apparatus is also characterized by being provided with three or more of the first injection portions, and being provided with a second injection portion that injects gas or liquid only into the raw fuel liquid injected from the first injection portions at both ends.

According to this evaporator raw fuel injection apparatus, the second injection portion is constructed to generate the stream only at the areas surrounding the evaporating chamber that have low evaporation efficiency, and this simple structure therefore allows evaporation of raw fuel liquid at a high efficiency.

The gas or liquid having a prescribed directional property is a gas or liquid injected in different fixed directions in order to generate a given air stream from the gas or liquid injected from the second injection portion. According to this embodiment, as shown in FIG. 6, air with different directional properties is injected from an air injection portion provided with air injection nozzles and air injection conduits in a construction suited for each air stream, in order to generate a swirl current (vortex), bent current, deflected current or offset current as the stream. For example, for a swirl current, the air is injected from four air injection nozzles and the direction of each air injection is the direction toward the adjacent air injection nozzle.

DESCRIPTION OF THE PREFERRED EMBODIMENTS

Figure 1:
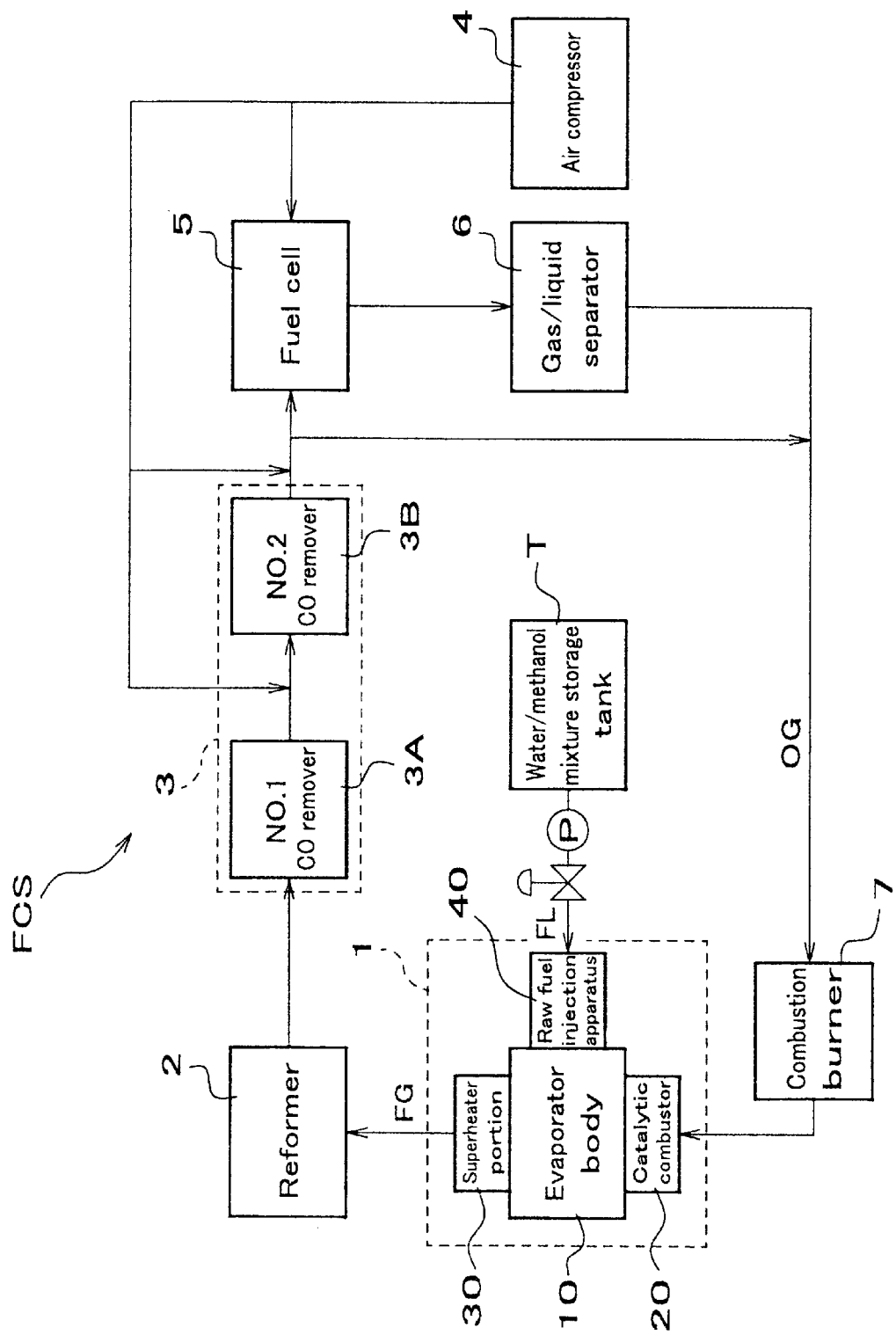
FIG. 1 is an overall constructional view of a fuel cell system provided with an evaporator according to the invention.
Figure 2:
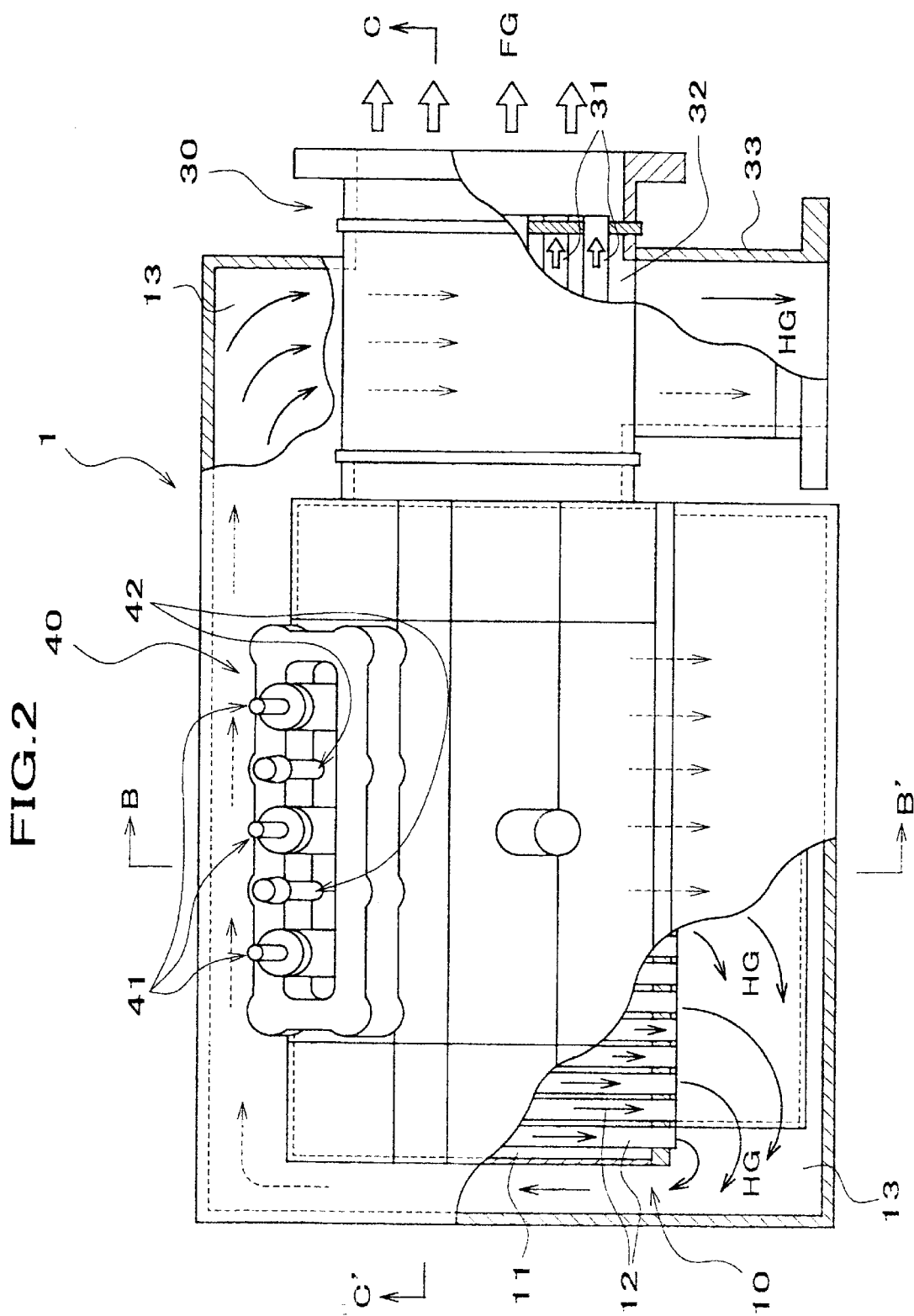
FIG. 2 is a partial cutaway plan view of an evaporator according to the invention.
Figure 3:
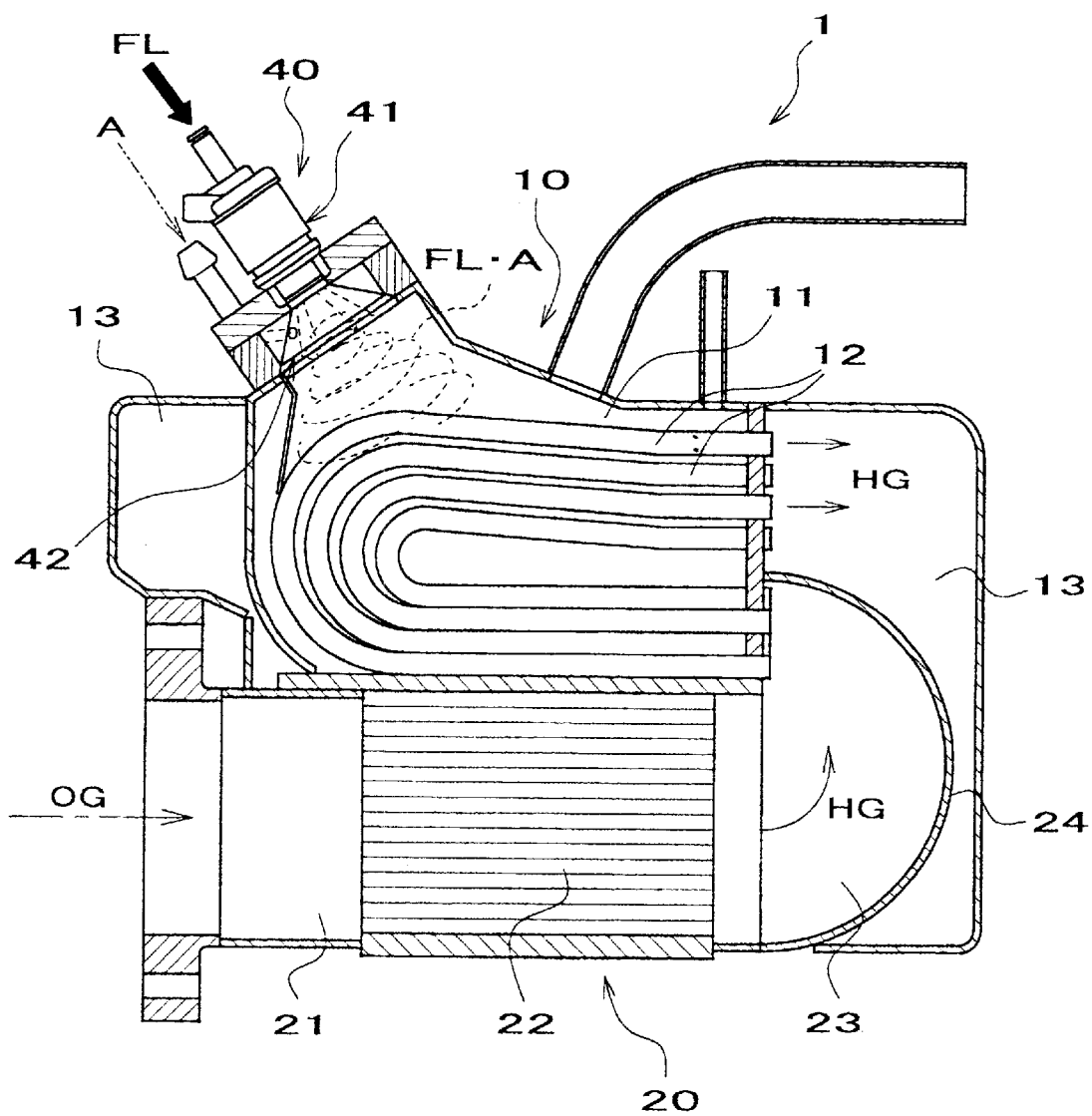
FIG. 3 is a cross-sectional view of the evaporator of FIG. 2 along line B–B'.
Figure 4:
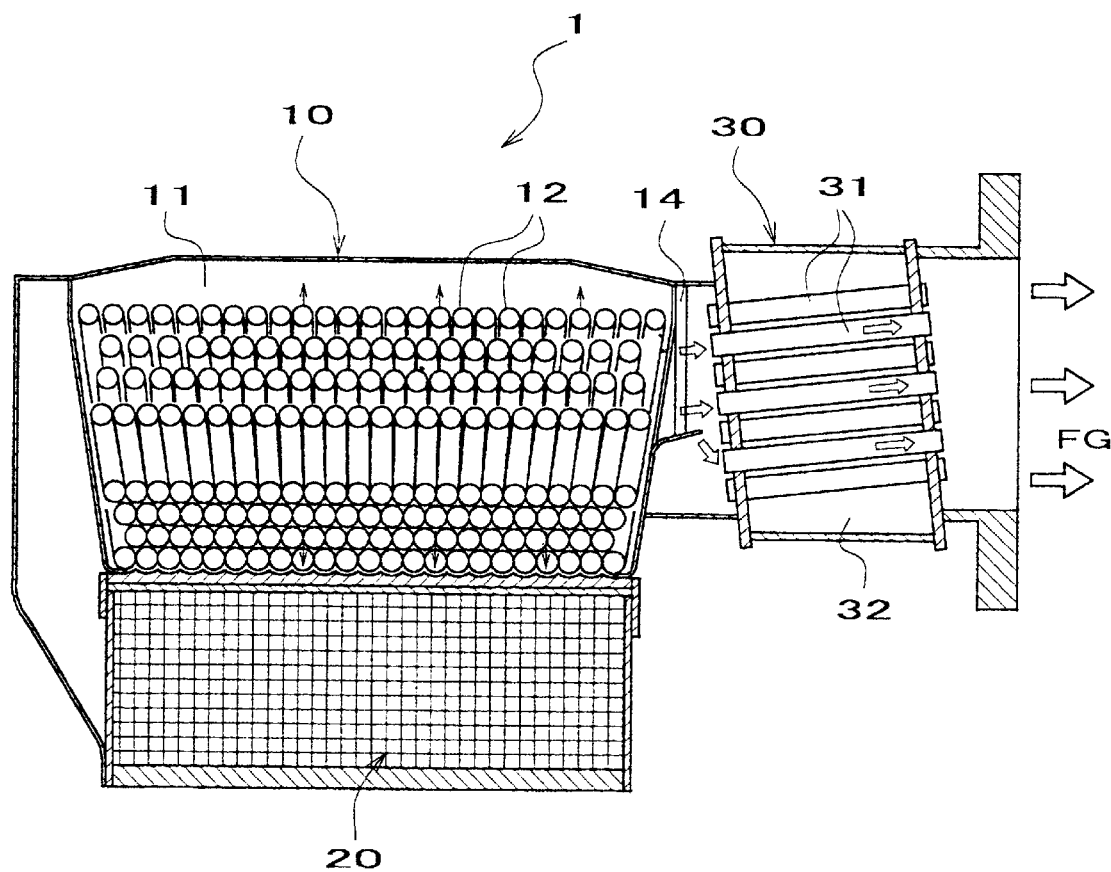
FIG. 4 is a cross-sectional view of the evaporator of FIG. 2 along line C–C'.
Figure 5:
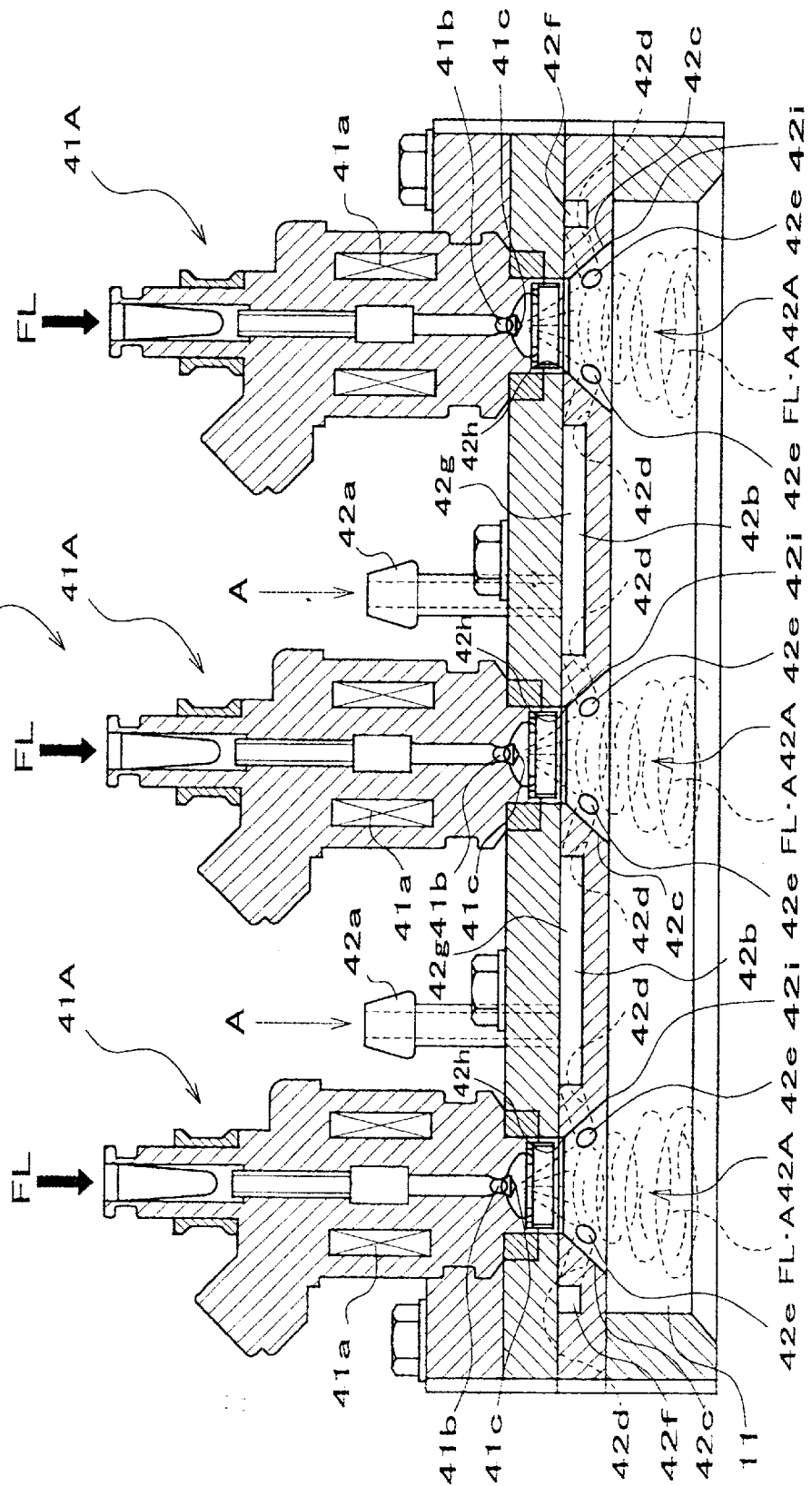
FIG. 5 is a front cross-sectional view of a raw fuel injection apparatus according to the first embodiment.
Figure 6:
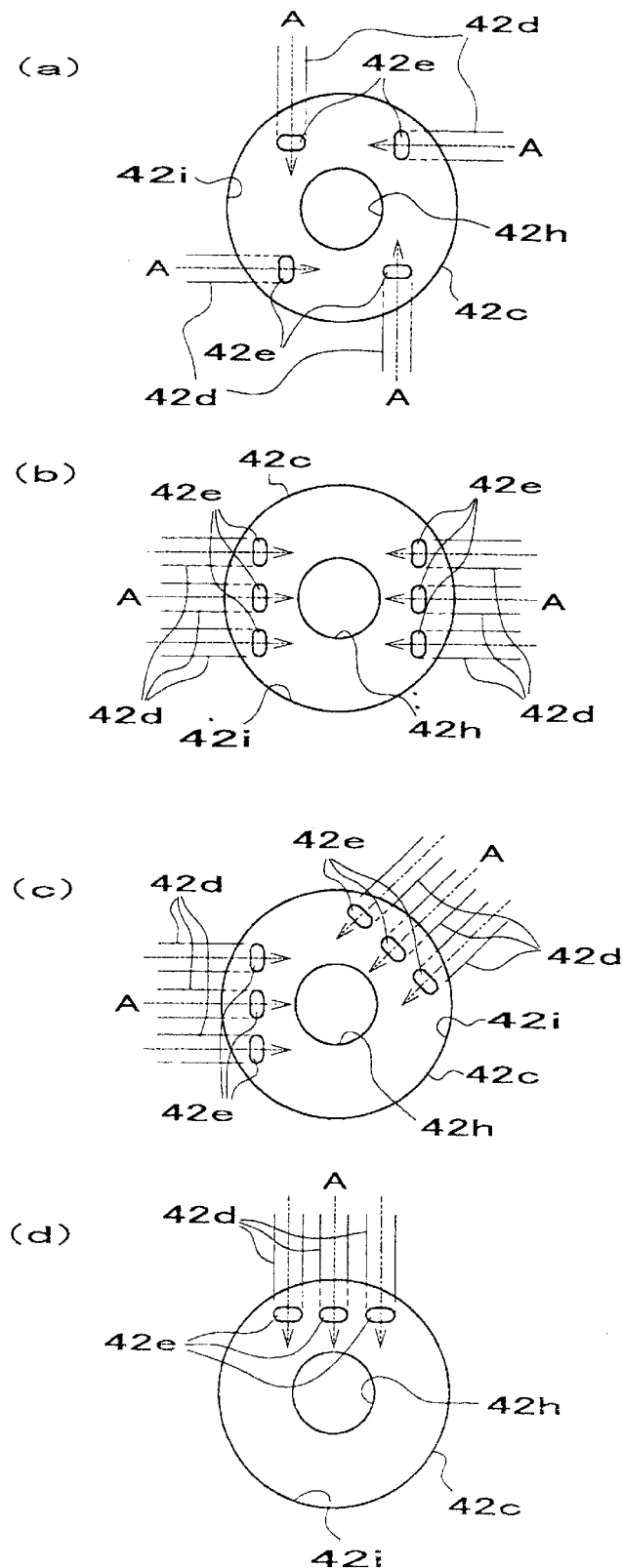
FIG. 6 is a constructional view of air injection nozzles and air injection conduits in the air injection portion of a raw fuel injection apparatus according to the invention, where (a) shows a swirl current, (b) shows a bent current, (c) shows a deflected current and (d) shows an offset current.
Figure 7:
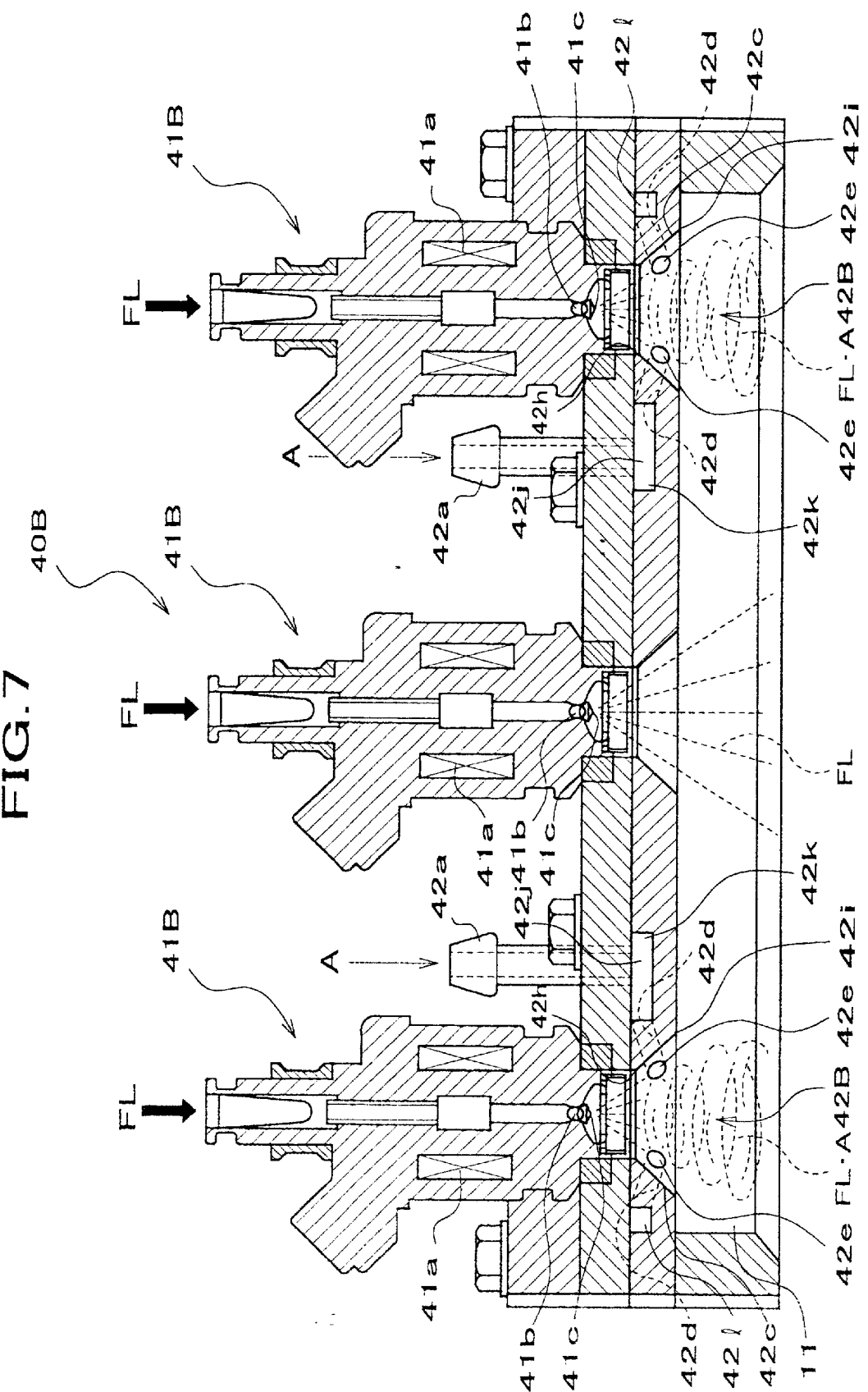
FIG. 7 is a front cross-sectional view of a raw fuel injection apparatus according to the second embodiment.
Figure 8:
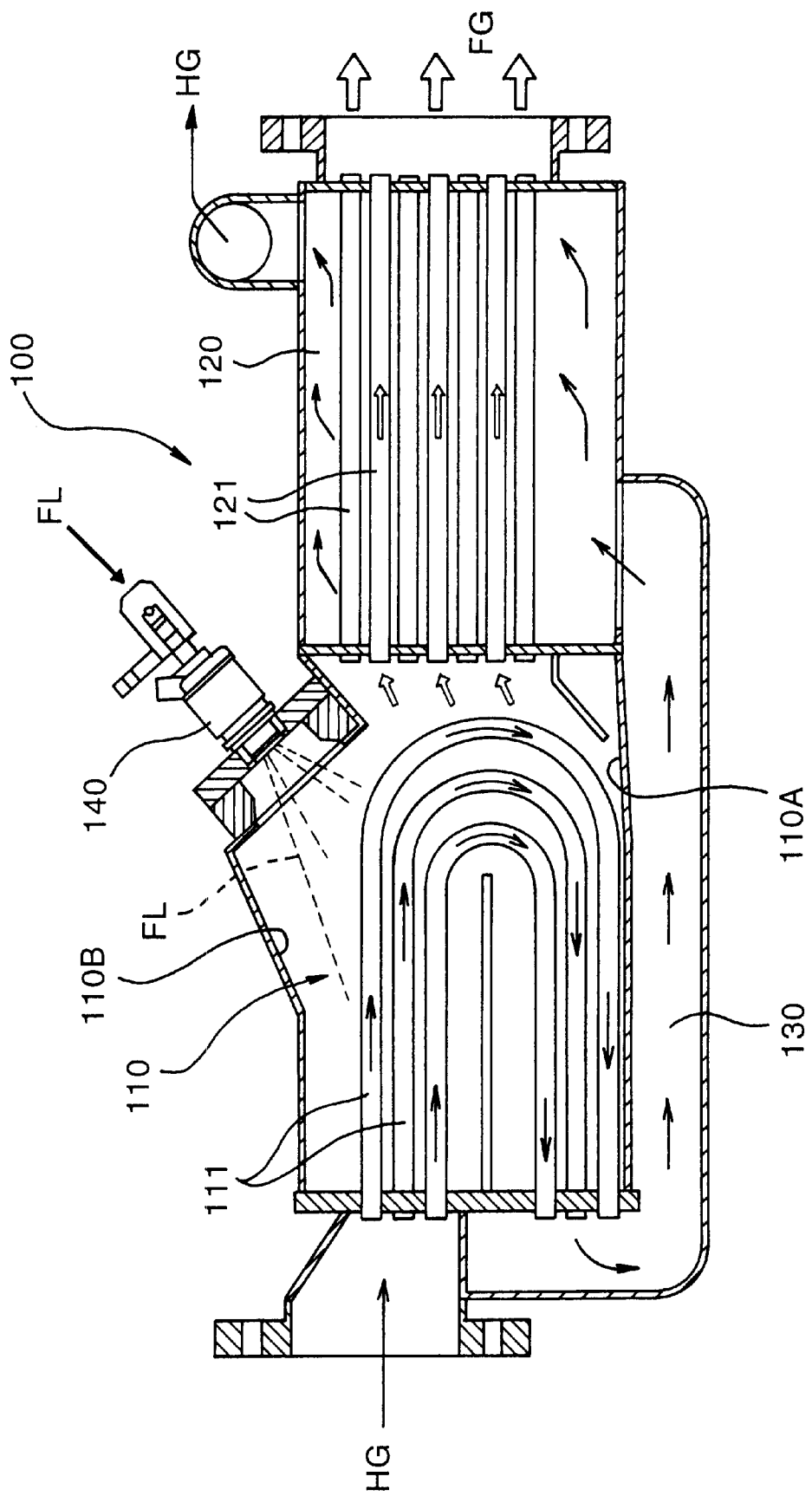
FIG. 8 is a front cross-sectional view of a raw fuel evaporator according to the prior art.

The preferred embodiments of the evaporator raw fuel injection apparatus of the invention will now be explained with reference to the attached drawings. FIG. 1 is an overall constructional view of a fuel cell system provided with an evaporator, FIG. 2 is a partial cutaway plan view of the evaporator, FIG. 3 is a cross-sectional view of the evaporator of FIG. 2 along line B–B', FIG. 4 is a cross-sectional view of the evaporator of FIG. 2 along line C–C', FIG. 5 is a front cross-sectional view of a raw fuel injection apparatus according to the first embodiment, FIG. 6 is a constructional view of air injection nozzles and air injection conduits in the air injection portion of a raw fuel injection apparatus where (a) shows a swirl current, (b) shows a bent current, (c) shows a deflected current and (d) shows an offset current, and FIG. 7 is a front cross-sectional view of a raw fuel injection apparatus according to the second embodiment.

The evaporator raw fuel injection apparatus of the invention injects gas or liquid from the second injection portion toward raw fuel liquid injected from the first injection portion, generating a stream with the injected gas or liquid. This stream adequately atomizes and further disperses the raw fuel liquid in the evaporating chamber. Consequently, the heat exchange efficiency with the heat obtained from the high temperature heating medium is improved, thus enhancing the evaporation efficiency of the raw fuel liquid. According to this embodiment, the evaporator raw fuel injection apparatus of the invention may be applied as an evaporator raw fuel injection apparatus in a methanol-reformed fuel cell system mounted in a fuel cell automobile. This embodiment also employs an autothermal system for the reformer, and uses a mixture of water and methanol as the raw fuel liquid, with oxygen-containing air as the reforming air. This embodiment also employs heating gas as the high temperature heating medium of the Claims. In this embodiment, as the gas or liquid as set forth in the Claims, air is used, and the air then serves as the reforming air. Thus, the injected air which is also reforming air mixes uniformly with the evaporated raw fuel liquid (raw fuel gas), so that the reforming rate in the reformer is enhanced.

The overall construction of the fuel cell system will first be explained with reference to FIG. 1.

The fuel cell system FCS comprises an evaporator 1, reformer 2, CO remover 3, air compressor 4, fuel cell 5, gas/liquid separator 6 and water/methanol mixture storage tank (hereunder, "tank") T. The evaporator 1 is provided with an evaporator body 10, a catalytic combustor 20, an superheater portion 30 and a raw fuel injection apparatus 40. The structure of the evaporator 1 will be explained in detail below.

In the evaporator 1, the water/methanol mixture which is the raw fuel liquid FL is pressurized with a pump P from the tank T, and the raw fuel liquid FL is evaporated to produce raw fuel gas FG and fed to the reformer 2. The raw fuel gas FG is gas which is a mixture of raw fuel gas from which the raw fuel liquid FL has been evaporated, and air which is reforming air. The reformer 2 generates hydrogen-rich gas from the raw fuel gas and supplies it to the CO remover 3. The CO remover 3 removes unwanted carbon monoxide included in the supplied hydrogen-rich gas by a NO.1 CO remover 3A and a NO.2 CO remover 3B, and supplies it to the anode (not shown) of the fuel cell 5. The fuel cell system FCS is also provided with an air compressor 4, and air is supplied from the air compressor 4 to the CO remover 3. The air compressor 4 also supplies oxygen-containing air to the cathode (not shown) of the fuel cell 5.

The fuel cell 5 causes a reaction between hydrogen and oxygen, converting the chemical energy to electrical energy. Not all of the gas chemically reacts in the fuel cell 5, but some gas remains containing unreacted hydrogen gas. This gas containing the unreacted hydrogen gas is therefore supplied to the gas/liquid separator 6. The gas/liquid separator 6 draws out the residual hydrogen gas (hereunder, "off gas OG") from this gas and feeds it to the evaporator 1. The catalytic combustor 20 of the evaporator 1 utilizes the off gas OG as a heat source. During warming of the catalytic combustor 20 of the evaporator 1 when starting an automobile or the like, a warming combustion burner 7 utilizes the off gas OG as a heat source and supplies the heating gas to the evaporator 1.

The construction of the evaporator 1 will now be explained with reference to FIG. 1 through FIG. 4.

As explained above, the evaporator 1 is provided with an evaporator body 10, a catalytic combustor 20, an superheater portion 30 and a raw fuel injection apparatus 40. The construction and function of the raw fuel injection apparatus 40 will be explained in detail below.

The evaporator body 10 has an evaporating chamber 11 formed therein which evaporates the raw fuel liquid FL by the heat received from the heating gas HG. The evaporating chamber 11 houses a plurality of U-shaped heat medium tubes 12, 12 . . . through which the heating gas HG flows. The raw fuel liquid FL from the fuel injection portion 41 of the raw fuel injection apparatus 40, which will be described later, and the air A from the air injection portion 42, are injected into the evaporating chamber 11. Thus, different streams are generated depending on the direction of injection of the air A, and the raw fuel liquid FL injected from the raw fuel injection apparatus 40 is atomized and dispersed by the stream. The atomized raw fuel liquid FL contacts the outside of the heat medium tubes 12, 12 . . . and evaporates by the heat energy of the heating gas HG flowing through the heat medium tubes 12, 12 . . .

According to this embodiment, the fuel injection portion 41 is the first injection portion described in the Claims. The air injection portion 42 of this embodiment is the second injection portion described in the Claims.

In the evaporator body 10 there is formed a heating gas conduit 13 through which the heating gas HG flows downstream from the heat medium tubes 12, 12 . . . after the raw fuel liquid FL has been evaporated while flowing through the heat medium tubes 12, 12 . . . The heating gas conduit 13 is situated around the evaporating chamber 11, as shown in FIG. 2 and FIG. 3, and connects with the superheater portion 30.

The catalytic combustor 20 is situated under the evaporator body 10. The catalytic combustor 20 has an inlet conduit 21 from which the off gas OG enters and a catalyst layer 22 downstream from the inlet conduit 21. The catalyst layer 22 is provided with a honeycomb carrier that supports the metal components of the catalyst. The catalyst layer 22 causes catalyst combustion of the off gas OG to generate high temperature heating gas HG.

The catalytic combustor 20 has an exit conduit 23 formed by a partition 24 downstream from the catalyst layer 22, and it is in connection with the heat medium tubes 12, 12 . . . The heating gas HG generated at the catalyst layer 22 flows into the heat medium tubes 12, 12 . . . via the exit conduit 23.

The superheater portion 30 is situated downstream from the evaporating body 10. The superheater portion 30 superheats the raw fuel liquid evaporated in the evaporating chamber 11 (i.e., the raw fuel gas FG) with the heating gas HG passing through the heating gas conduit 13. The superheater portion 30 has an superheating chamber 32, and a plurality of evaporating tubes 31, 31 . . . are situated in the superheating chamber 32. The downstream end of the evaporating tubes 31, 31 . . . is connected with a reformer 2 via piping (not shown), and the raw fuel gas FG is thereby supplied to the reformer 2. Downstream from the superheater portion 32 there is provided an exhaust duct 33, and the heating gas HG is discharged through this exhaust duct 33. If the raw fuel liquid FL evaporated at the evaporating chamber 11 has a sufficient amount of heat, it may be fed to the reformer 2 at the subsequent step without passing through the superheater portion 30.

An explanation will now be given regarding the process of evaporation of the raw fuel liquid FL by the evaporator 1 having the construction described above.

First, the off gas OG separated by the gas/liquid separator 6 shown in FIG. 1 is supplied to the catalytic combustor 20 of the fuel evaporator 1. The off gas OG supplied to the catalytic combustor 20 undergoes catalytic combustion at the catalytic combustor 20 and is converted to high temperature heating gas HG. The heating gas HG flows through the exit conduit 23 into the heat medium tubes 12, 12 . . . of the evaporator body 10. Incidentally, the temperature of the heating gas HG in the exit conduit 23 is about 650–700° C.

As the heating gas HG flows through the heat medium tubes 12, 12 . . . , the outside of the heat medium tubes 12, 12 . . . situated in the evaporating chamber 11 increases in temperature. The raw fuel liquid FL and air A are injected into the evaporating chamber 11 from the raw fuel injection apparatus 40. Incidentally, the air A is injected from a plurality of locations in different fixed directions toward the raw fuel liquid, generating an air stream. The raw fuel liquid FL is thus atomized and dispersed by this air stream, and contacts with the outside of the heat medium tubes 12, 12 . . . The raw fuel liquid FL also undergoes heat exchange with the heat received from the heating gas HG flowing through the heat medium tubes 12, 12 . . . and evaporates, being converted to raw fuel gas FG. The raw fuel gas FG is discharged from the evaporating chamber 11 through the evaporating tubes 31, 31 . . . of the superheater portion 30.

Meanwhile, the heating gas HG that has passed through the heat medium tubes 12, 12 . . . is discharged into the heating gas conduit 13. Incidentally, the temperature of the heating gas HG that has been discharged into the heating gas conduit 13 is about 350° C. The heating gas HG flowing through the heating gas conduit 13 is fed to the superheating chamber 32 of the superheater portion 30 while warming the area around the evaporating chamber 11. The raw fuel gas FG flowing through the evaporating tubes 31, 31 . . . is therefore superheated by the heating gas HG in the superheating chamber 32. The superheated raw fuel gas FG is fed to the reformer 2 while the heating gas HG is discharged via the exhaust duct 33.

The construction of the raw fuel injection apparatus 40 will now be explained. Two embodiments of the raw fuel injection apparatus 40 according to this mode will be described in detail. First, the construction of a raw fuel injection apparatus 40A according to the first embodiment will be explained with reference to FIG. 5 and FIG. 6. FIG. 1 through FIG. 4 will also be referred to as appropriate.

The raw fuel injection apparatus 40A comprises three fuel injection portions 41A, 41A, 41A and three air injection portions 42A, 42A, 42A provided for each fuel injection portion 41A, 41A, 41A. The fuel injection portions 41A, 41A, 41A and air injection portions 42A, 42A, 42A are connected to and controlled by an Electronic Control Unit (ECU) (not shown). The three fuel injection portions 41A, 41A, 41A are arranged in a row above the evaporator body 10, and they inject the raw fuel liquid FL toward the heat medium tubes 12, 12 . . . in the evaporating chamber 11. The three air injection portions 42A, 42A, 42A are arranged in a row with their main portions between the fuel injection portions 41A, 41A, 41A and the evaporating chamber 11, and they inject air A into the raw fuel liquid FL injected from each of the fuel injection portions 41A, 41A, 41A. Each of the air injection portions 42A generate an air stream by the air injected in the respective fixed directions at each location, and the air streams atomize and disperse the raw fuel liquid FL. Each of the air injection portions 42A can set the injecting direction of the raw fuel liquid FL by their generated air streams. The air A injected from the air injection portions 42A is uniformly mixed with the evaporated raw fuel liquid FL and supplied to the reformer 2 to function as reforming air.

Each fuel injection portion 41A has a valve 41b that is opened when current flows to a solenoid coil 41a, whereby the raw fuel liquid FL is injected from a fuel injecting nozzle 41c. In the fuel injection portion 41A, raw fuel liquid FL which is a mixture of water and methanol is pressurized from the tank T by a pump P (see FIG. 1). The injected raw fuel liquid FL is released from the fuel injection nozzle 41c which has a small aperture area, and begins to be dispersed.

The fuel injection portion 41A is situated above the evaporating chamber 11 and at the curved ends of the heat medium tubes 12, 12 . . . (see FIG. 3). Also, the fuel injection portion 41A is oriented at a slant in order to accomplish injection from the curved ends of the heat medium tubes 12, 12 . . . to the heating gas HG exit port end of the heat medium tubes 12, 12 . . . (see FIG. 3).

The air injection portion 42A comprises an air introduction inlet 42a, an air circulation conduit 42b, an air injection cone 42c, an air injection conduit 42d and an air injection nozzle 42e. Any number of air injection conduits 42d and air injection nozzles 42e are provided for the air streams to be generated. The center air injection portion 42A is constructed to use the air introduction inlets 42a, 42a and air circulation conduits 42b, 42b of the air injection portions 42A, 42A on either side.

The air introduction inlet 42a is provided above the evaporating chamber 11 between the two fuel injection portions 41A, 41A (as viewed from the front) and slightly after the fuel injection portion 41A (as viewed from the top). As mentioned above, the air introduction inlets 42a are shared by the center air injection portion 42A and the air injection portions 42A, 42A on either side thereof, and therefore two inlets are provided for three air injection portions 42A, 42A, 42A. The two air introduction inlets 42a, 42a are situated between the fuel injection portions 41A, 41A, 41A. The air introduction inlet 42a is connected to a conduit (not shown) at one end, and an air compressor (not shown) is connected to the conduit. The air introduction inlet 42a is also connected to an air circulation conduit 42b at the other end. The air introduction inlet 42a feeds compressed air A introduced from the air compressor to the air circulation conduit 42b. The aforementioned piping and air compressor may also be included in the construction of the air injection portion 42A.

As shown in FIG. 5, the air circulation conduit 42b is formed as a donut shape (as viewed from the top) surrounding the air injection cone 42c at a fixed height above the evaporating chamber 11. The air circulation conduits 42b are shared by the center air injection portion 42A and the air injection portions 42A, 42A on either side thereof, and therefore two conduits are provided for three air injection portions 42A, 42A, 42A. The two air circulation conduits 42b, 42b are provided surrounding the air injection cones 42c, 42c of the air injection portions 42A, 42A on each side. Each air circulation conduit 42b is formed as a donut shape with an irregular radial direction length, the radial direction length extending to the air injecting cone 42c side of the center air injection portion 42A. Thus, a cross-sectional view of the air circulation conduit 42b shows rectangular shapes 42g extending to the center air injecting cone 42c at the center, and approximately square shapes 42f at both ends. One end of the air introduction inlet 42a is connected to the top of the air circulating conduit 42b, and the air injection conduit 42d is connected to the inside thereof. The air circulation conduit 42b supplies the air A fed from the air introduction inlet 42a to the air injection conduit 42d.

The air injection cone 42c is formed in a cone shape with the upper end thereof opening between the fuel injection portion 41A and the evaporating chamber 11. The top opening 42h of the air injection cone 42c at its upper end is situated below the fuel injection portion 41A in a manner that prevents leakage of the raw fuel liquid FL injected from the fuel injection portion 41A. The air injection cone 42c feeds into the evaporating chamber 11 in a manner that prevents leakage of the raw fuel liquid FL injected from the fuel injection portion 41A and the air A injected from the air injection nozzle 42e, and therefore the bottom opening 42i at the lower end is situated at the top of the evaporating chamber 11.

The air injection cone 42c has the air injection nozzle 42e formed at the side, and each air injection conduit 42d is connected to its air injection nozzle 42e. Thus, the inside of the air injection cone 42c is a space where air A is injected from the air injection nozzle 42e into the raw fuel liquid FL injected from the fuel injection section 41A. The air injection cone 42c guides the raw fuel liquid FL and air A to the evaporating chamber 11.

The air injection conduit 42d is positioned as an air conduit joining the air injection nozzle 42e and the air circulation conduit 42b, and the injecting direction of the air A is determined by the angle of positioning. The number of air injection conduits 42d provided is equal to the number of air injection nozzles 42e. Each air injection conduits 42d supplies air A from the air circulation conduit 42b to the air injection nozzle 42e.

The air injection nozzle 42e is formed at the side of the air injection cone 42c, and it injects air A into the air injection cone 42c. The air injection nozzle 42e determines the direction of injection of the generated air stream and raw fuel liquid FL, and therefore a prescribed number are provided at prescribed locations (see FIG. 6). The air injection nozzle 42e injects air A into the raw fuel liquid FL injected from the fuel injection portion 41A, directly below the fuel injection portion 41A.

The construction of the air injection conduit 42d and air injection nozzle 42e formed for the stream to be generated will now be explained with reference to FIG. 6. For this mode, the four patterns of swirl current, bent current, deflected current and offset current will be explained. FIG. 6 is a view of the air injection section 42A from the evaporating chamber 11 side.

The construction of air injection conduits 42d and air injection nozzles 42e for generation of a swirl current will now be explained with reference to FIG. 6(a). Four air injection nozzles 42e are formed at roughly equal spacings in the circumferential direction of the air injection cone 42c. Each air injection conduit 42d is situated between the air injection nozzle 42e and air circulation conduit 42b so that the air A injected from each air injection nozzle 42e is injected toward the adjacent air injection nozzle 42e (see arrows in FIG. 6(a)). The air A, A injected from the two air injection nozzles 42e, 42e is not injected toward the same air injection nozzle 42e, so that the air A injected from the four air injection nozzles 42e, 42e, 42e, 42e generates a stream circling in one direction. Since the air injection nozzles 42e, 42e, 42e, 42e have identical aperture areas, all of the injected air A has the same injection volume and injection pressure.

In FIG. 6(a), therefore, the air A, A, A, A from the air injection nozzles 42e, 42e, 42e, 42e is injected so as to circle in the counter-clockwise direction as viewed from the evaporating chamber 11 side, thus generating a counter-clockwise swirl current. The raw fuel liquid FL injected from the fuel injection portion 41A flows into this swirl current, and the raw fuel liquid FL enters the evaporating chamber 11 while circling with the air A. At this time, the raw fuel liquid FL is rapidly atomized by the centrifugal force of circling, and is uniformly dispersed in the evaporating chamber 11. Because the raw fuel liquid FL is directed toward the heat medium tubes 12, 12 . . . while circling, the time until it reaches the heat medium tubes 12, 12 . . . is prolonged, thus ensuring that much longer a time for atomization and dispersion.

The construction of air injection conduits 42d and air injection nozzles 42e for generation of a bent current will now be explained with reference to FIG. 6(b). One row of three air injection nozzles 42e, 42e, 42e and another row of three air injection nozzles 42e, 42e, 42e are formed in the air injection cone 42c opposite each other and sandwiching the top opening 42h. Each of the air injection conduits 42d are situated between each air injection nozzle 42e and the air circulation conduit 42b so that the air A injected from one air injection nozzle 42e is injected toward the other air injection nozzle 42e opposite it and sandwiching the top opening 42h (see arrows in FIG. 6(b)). The first row of air injection nozzles 42e, 42e, 42e and the second row of air injection nozzles 42e, 42e, 42e have different aperture areas, and therefore the air A is injected at different injection volumes and injection pressures across the top opening 42h. Incidentally, the three air injection nozzles 42e, 42e, 42e in the same row have the same aperture area.

Consequently, since the air A, A, A injected from one row of air injection nozzles 42e, 42e, 42e and the air A, A, A injected from the other row of air injection nozzles 42e, 42e, 42e produce different injection volumes and injection pressures, an air stream is generated in a fixed direction. That is, the direction of injection of the raw fuel liquid FL injected from the fuel injection portion 41A is bent toward the three air injection nozzles 42e, 42e, 42e injecting the air A with the lower injection volume (lower injection pressure). This bent current generated by the air A injected from the six air injection nozzles 42e also promotes atomization and dispersion of the raw fuel liquid FL injected from the fuel injection portion 41A.

The construction of air injection conduits 42d and air injection nozzles 42e for generation of a deflected current will now be explained with reference to FIG. 6(c). One row of three air injection nozzles 42e, 42e, 42e and another row of three air injection nozzles 42e, 42e, 42e are formed in the air injection cone 42c so that the narrow angle formed by extended lines from one row of nozzles and the other row of nozzles is approximately 60°. Also, each air injection conduit 42d is arranged between each air injection nozzle 42e and air circulation conduit 42b in such a manner that the narrow angle formed by the direction of injection of the air A injected from one air injection nozzle 42e and the direction of injection of the air A injected from the other air injection nozzle 42e is approximately 120° (see arrows in FIG. 6(c)). The first row of air injection nozzles 42e, 42e, 42e and the second row of air injection nozzles 42e, 42e, 42e have the same aperture area, and therefore the injected air A has the same injection volume and injection pressure.

Consequently, the air A injected from one row of three air injection nozzles 42e, 42e, 42e and the air A injected from the other row of three air injection nozzles 42e, 42e, 42e collide at the center of the air injection cone 42c, generating an air stream in a fixed direction. This fixed direction is determined by the injecting direction of the air A injected from one row of air injection nozzles 42e and the injecting direction of the air A injected from the other row of air injection nozzles 42e, and it is a direction roughly 120° from the two injecting directions. As a result, the raw fuel liquid FL injected from the fuel injection portion 41A is deflected in this fixed direction. The deflection current generated by the air A injected from the six air injection nozzles 42e also promotes atomization and dispersion of the raw fuel liquid FL injected from the fuel injection portion 41A.

The construction of air injection conduits 42d and air injection nozzles 42e for generation of an offset current will now be explained with reference to FIG. 6(d). One row of three air injection nozzles 42e, 42e, 42e is formed in the air injection cone 42c. Each air injection conduit 42d is arranged between each air injection nozzle 42e and air circulation conduit 42b in such a manner that the air A, A, A is injected from the three air injection nozzles 42e, 42e, 42e (see arrows in FIG. 6(d)). The row of three air injection nozzles 42e, 42e, 42e have the same aperture area, and therefore all of the injected air A has the same injection volume and injection pressure.

Consequently, the air A, A, A injected from the row of three air injection nozzles 42e, 42e, 42e generates an air stream in a fixed direction. As a result, the raw fuel liquid FL injected from the fuel injection portion 41A is offset in a fixed direction. The offset current generated by the air A injected from the three air injection nozzles 42e also promotes atomization and dispersion of the raw fuel liquid FL injected from the fuel injection portion 41A.

The function of a raw fuel injection apparatus 40A having the construction described above will now be explained.

As explained above, the construction of the air injection conduits 42d and air injection nozzles 42e of the air injection portion 42A are designed in accordance with the air stream to be generated. When atomization and dispersion of the raw fuel liquid FL is of greatest importance, the construction of the air injection conduits 42d and air injection nozzles 42e is designed to generate a swirl current which is highly effective for atomization and dispersion of the raw fuel liquid FL.

When the injecting direction of the raw fuel liquid FL is of greatest importance, the construction of the air injection conduits 42d and air injection nozzles 42e is designed to generate a bent current, deflected current or offset current. For example, in order to improve the evaporating efficiency, the injecting direction is set to a direction such that the injection volume is increased to the high temperature section of the heat medium tubes 12, 12 . . . of the evaporating chamber 11 while the injection volume is decreased to the low temperature section, depending on the heat distribution in the evaporating chamber 11. In order to prevent loss of evaporating efficiency, the injecting direction is set to a direction such that the raw fuel liquid FL does not scatter and adhere as liquid droplets on the inner wall of the evaporating chamber 11. In order to prevent scattering of excess liquid droplets from the evaporator 1, the injecting direction is set to a direction such that the raw fuel liquid FL is not injected toward the superheater portion 30.

The three air injection portions 42A, 42A, 42A may all have the air injection conduits 42d and air injection nozzles 42e constructed so as to generate the same air stream, or they may have the air injection conduits 42d and air injection nozzles 42e constructed so as to generate different air streams. In either case, the major purpose is to improve the evaporation efficiency of the raw fuel liquid FL.

The raw fuel injection apparatus 40A injects the raw fuel liquid FL from the injection portion 41A and air A from the air injection portion 42A based on a control signal from the ECU. In the fuel injection portion 41A, the electrization time and electrization timing to the solenoid 41a are determined by the control signal, and the raw fuel liquid FL is injected with the injection volume and injection timing based on the control signal. The injection timing is controlled to the optimum injection interval for evaporation, such as intermittent injection or random injection, and the injection volume is also controlled to the optimum volume depending on the heat distribution, etc. outside the heat medium tubes 12, 12 . . .

In the air injection portion 42A, an air compressor (not shown) is controlled by a control signal and the air A is injected according to the air volume (injection pressure) and injecting timing based on the control signal. The air injection portion 42A is controlled so that the air A is always injected at least during injection of the raw fuel liquid FL from the fuel injection portion 41A. The injection volume of air A is controlled to the optimum volume according to the injection volume of the raw fuel liquid FL.

Air A is injected from the air injection nozzle 42e in the air injection cone 42c situated directly below the fuel injection portion 41A, into the raw fuel liquid FL injected from the fuel injection nozzle 41c of the fuel injection portion 41A. This causes the raw fuel liquid FL to flow in with the air stream generated by the air A. The raw fuel liquid FL is also atomized and dispersed while uniformly mixing with the air A. When the air stream is a bent current, deflected current, offset current or the like, the raw fuel liquid FL injecting direction is appropriately set and the stream is directed in a fixed direction.

The atomized raw fuel liquid FL contacts with the heat medium tubes 12, 12 . . . situated in the evaporating chamber 11. The raw fuel liquid FL then uniformly disperses outside the heat medium tubes 12, 12 . . . due to the air stream. When the injecting direction is determined by the air injection portion 42A, the raw fuel liquid FL is dispersed while concentrating at the high temperature sections of the heat medium tubes 12, 12 . . . or is dispersed in a direction not directed toward the inside wall of the superheater portion 30 or evaporating chamber 11. Also, since the raw fuel liquid FL is atomized, it undergoes heat exchange at high efficiency with the heat received from the heating gas HG flowing through the heat medium tubes 12, 12 . . . and is evaporated into raw fuel gas FG. As a result, the raw fuel liquid FL is evaporated at a very high efficiency. The raw fuel gas FG mixes uniformly with the air A and flows into the superheater portion 30.

According to this raw fuel injection apparatus 40A, the air stream generated by the air A injected from the air injection portion 42A promotes atomization and dispersion of the raw fuel liquid FL injected from the fuel injection portion 41A, thus improving the evaporating efficiency of the raw fuel liquid FL. In addition, since the raw fuel gas FG which is uniformly mixed with the air A is supplied to the reformer 2 as reforming air, the reforming efficiency is improved and no separate means is required for supplying reforming air. The raw fuel injection apparatus 40A is also provided with three fuel injection portions 41A and air injection portions 42A corresponding to the size of the evaporating chamber 11, and therefore the atomized raw fuel liquid FL can be dispersed over the entire region of the evaporating chamber 11, thus allowing further improved evaporating efficiency.

The construction of a raw fuel injection apparatus 40B according to the second embodiment will be explained with reference to FIG. 7. FIG. 1 through FIG. 6 will also be referred to as appropriate. The raw fuel injection apparatus 40B is indicated by identical numerals for the structural elements that are equivalent to those of the raw fuel injection apparatus 40A described above, and their explanation will therefore be omitted.

The raw fuel injection apparatus 40B comprises three fuel injection portions 41B, 41B, 41B and two air injection portions 42B, 42B provided for the fuel injection portions 41B, 41B on either side. Thus, no air A is injected into the raw fuel liquid FL injected from the center fuel injection portion 41B. The fuel injection portions 41B, 41B, 41B and the air injection portions 42B, 42B are connected to and controlled by an Electronic Control Unit (ECU) (not shown). The three fuel injection portions 41B, 41B, 41B are arranged in a row above the evaporator body 10, and they inject the raw fuel liquid FL toward the heat medium tubes 12, 12 . . . in the evaporating chamber 11. The two air injection portions 42B, 42B inject air A into the raw fuel liquid FL injected from the fuel injection portions 41B, 41B on either side, and generate air streams which atomize and disperse the raw fuel liquid FL. The raw fuel liquid FL injected from the center fuel injection portion 41B is directly supplied into the evaporating chamber 11 from the fuel injection nozzle 41c. Incidentally, the two air injection portions 42B, 42B can set the injecting direction of the raw fuel liquid FL by injecting the respective air A into the raw fuel liquid FL.

The fuel injection portion 41B has the same construction as the fuel injection portion 41A. and its explanation will therefore be omitted.

The air injection portion 42B comprises an air introduction inlet 42a, an air circulation conduit 42j, an air injection cone 42c, an air injection conduit 42d and an air injection nozzle 42e. Any number of air injection conduits 42d and air injection nozzles 42e are provided for the air streams to be generated.

The air introduction inlet 42a is not shared, and therefore one is provided for each of the two air injection portions 42B, 42B.

The air circulation conduit 42j is formed as a donut-shaped (as viewed from the top) air conduit surrounding the air injection cone 42c at a fixed height above the evaporating chamber 11. The air circulation conduits 42j are not shared, and therefore a conduit is provided for each of the two air injection portions 42B, 42B. Each air circulation conduit 42j is formed as a donut shape with an irregular radial direction length, the radial direction length extending to the center side so that the air introduction inlet 42a is situated at the top. Incidentally, a cross-sectional view of the air circulation conduit 42j shows rectangular shapes 42k extending slightly to the center at the center, and approximately square shapes 42l at both ends. One end of the air introduction inlet 42a is connected to the top of the air circulating conduit 42j, and the air injection conduit 42d is-connected to the inside of the air circulation conduit 42j. The air circulation conduit 42j supplies the air A fed from the air introduction inlet 42a to the air injection conduit 42d.

The air injection conduits 42d and air injection nozzles 42e are designed in accordance with the air stream to be generated, similar to those of the air injection portion 42A. The construction of the air injection conduits 42d and air injection nozzles 42e of the air injection portion 42B is designed in accordance with the purpose, depending on whether atomization and dispersion of the raw fuel liquid FL is of greatest importance or the injecting direction of the raw fuel liquid FL is of greatest importance, as with the raw fuel injection apparatus A. For either construction, the main purpose is that of improving the evaporating efficiency of the raw fuel liquid FL.

The function of a raw fuel injection apparatus 40B having the construction described above will now be explained.

The raw fuel injection apparatus 40B injects the raw fuel liquid FL from the injection portion 41B and air A from the air injection portion 42B based on a control signal from the ECU. In the fuel injection portion 41B as well, the injection timing and injection volume for the raw fuel liquid FL and air A are controlled based on the control signal, similar to the raw fuel injection apparatus 40A.

Air A is injected from the air injection nozzle 42e in each air injection cone 42c, 42c situated directly below each fuel injection portion 41B, 41B into the raw fuel liquid FL injected from each fuel injection nozzle 41c, 41c of the fuel injection portions 41B, 41B on either side. This causes the raw fuel liquid FL to flow in with the air stream generated by the air A. The raw fuel liquid FL is also atomized and dispersed while uniformly mixing with the air A. When the air stream is a bent current, deflected current, offset current or the like, the raw fuel liquid FL injecting direction is appropriately set and the stream is directed in a fixed direction. On the other hand, the raw fuel liquid FL injected from the fuel injection nozzle 41c of the center fuel injection portion 41B is directly atomized and dispersed as it enters the evaporating chamber 11.

At both ends of the evaporating chamber 11, the atomized raw fuel liquid FL contacts with the heat medium tubes 12, 12 . . . situated in the evaporating chamber 11. The raw fuel liquid FL then uniformly disperses outside the heat medium tubes 12, 12 . . . due to the air stream generated by the air injection portion 42B. Heat does not collect at both ends of the evaporating chamber 11, and therefore the heat energy received from the heating gas HG flowing through the heat medium tubes 12, 12 . . . is lower than at the center of the evaporating chamber 11, and the evaporating efficiency is lower than at the center. However, since the raw fuel liquid FL is atomized by the air stream, it undergoes efficient heat exchange with the heat received from the heating gas HG flowing through the heat medium tubes 12, 12 . . . , and is evaporated. As a result, the raw fuel liquid FL is evaporated at a very high efficiency.

On the other hand, at the center of the evaporating chamber 11, the raw fuel liquid FL injected from the fuel injection nozzle 41c of the center fuel injection portion 41B is directly atomized and dispersed, and contacts with the heat medium tubes 12, 12 . . . Because this raw fuel liquid FL is not affected by the air stream, it undergoes less atomization and dispersion than the raw fuel liquid FL injected from the fuel injection portions 41B, 41B on either side. However, heat tends to build up at the center of the evaporating chamber 11, and there is consequently greater heat energy from the heating gas HG flowing in the heat medium tubes 12, 12 . . . , which facilitates evaporation. The evaporating efficiency is therefore sufficiently high even with raw fuel liquid FL that has not progressed to atomization and dispersion.

In the evaporating chamber 11, the raw fuel liquid FL injected and evaporated at both ends, the air A injected at both ends and the raw fuel liquid FL injected and evaporated at the center are uniformly mixed into raw fuel gas FG. The raw fuel gas FG flows into the superheater portion 30 where it is superheated, and is then fed to the reformer 2.

According to this raw fuel injection apparatus 40B, the air injection portions 42B, 42B inject air only into the raw fuel liquid FL injected from the fuel injection portions 41B, 41B on either side, and therefore the raw fuel liquid FL that has been atomized and dispersed is injected to both ends of the evaporating chamber 11 depending on the heat distribution in the evaporating chamber 11. Consequently, the raw fuel injection apparatus 40B can provide improved evaporating efficiency with a simpler construction.

The present invention is not limited to the embodiments described above, and it may be carried out in various different modes.

For example, this mode was explained for a construction where the air injection portions generate air streams of four patterns, but there is no limitation to these four patterns, and the construction may be such that a second injection portion generates various different air streams that promote atomization and dispersion.

Also, the number, position and aperture size of the air injection nozzles of the air injection portion and the direction in which the air injection conduits are set may be determined for various constructions depending on the air stream to be generated.

Furthermore, while the air injection portion was constructed with an air introduction inlet, air circulation conduit, air injection cone, air injection conduit and air injection nozzle, the second injection portion is not limited to such a construction so long as it can inject the gas or liquid with the prescribed directional property.

Here, three fuel injection portions were situated in a row and the air injection portions were situated to correspond to the fuel injection portions, but the optimum number of first injection portions and second injection portions may be situated depending on the shape and size of the evaporating chamber.

The gas or liquid injected into the injected raw fuel liquid may be any gas or liquid other than air. With a liquid, it is possible to introduce and inject water to be used for reforming, or liquefied oxygen to serve as an oxidizing agent for the fuel cell. Also, with a liquid, a mixed solution of water and methanol may be injected as the raw fuel liquid from the second injection portion and combined with the raw fuel liquid injected from the first injection portion for injection of a large volume of raw fuel liquid into the evaporating chamber, resulting in generation of a large volume of raw fuel gas.

The evaporator raw fuel injection apparatus according to one aspect of the invention generates an air stream by gas or liquid injected from a second injection portion, and the air stream atomizes the raw fuel liquid injected from the first injection portion while dispersing it in the evaporating chamber. Consequently, heat exchange efficiency between the raw fuel liquid and the heat received from the high temperature heating medium in the evaporating chamber is improved, thus increasing the evaporation efficiency.

The evaporator raw fuel injection apparatus according to another aspect of the invention generates a swirl current by the gas or liquid injected from the second injection portion, which allows further atomization and dispersion of the raw fuel liquid injected from the first injection portion, for further improved evaporation efficiency.

The evaporator raw fuel injection apparatus according to still another aspect 3 of the invention has a construction wherein the second injection portion generates an air stream only at both ends of the evaporating chamber where the evaporation efficiency is low due to the heat distribution, and this simple structure therefore allows evaporation of raw fuel liquid at a high efficiency.

What is claimed is:

1. An evaporator raw fuel injection apparatus which comprises:
    an evaporating chamber having a plurality of U-shaped heat medium tubes in which raw fuel liquid is evaporated by a high temperature heating medium flowing through said heat medium tubes, said evaporating chamber being located within a heating gas conduit and upstream of a super-heating chamber having a plurality of evaporating tubes;
    a first injection portion that injects said raw fuel liquid into said evaporating chamber; and
    a second injection portion that injects gas or liquid with a prescribed directional property, according to heat distribution in the evaporating chamber, into the raw fuel liquid injected from said first injection portion and
    wherein said prescribed directional property of the gas or liquid injected from said second injection portion forms the raw fuel liquid injected from said first injection portion into any one of a swirling current, a bent current, a deflected current and an offset current.

2. An evaporator raw fuel injection apparatus according to claim 1, which is provided with three or more of said first injection portions, and
    which is provided with a second injection portion that injects gas or liquid only into the raw fuel liquid injected from said first injection portions on either side.

3. An evaporator raw fuel injection apparatus according to claim 1, wherein said first injection portion injects an optimum volume of said raw fuel liquid at an optimum injection interval for evaporation.

* * * * *